United States Patent [19]

Brophy

[11] Patent Number: 5,369,953
[45] Date of Patent: Dec. 6, 1994

[54] THREE-GRID ACCELERATOR SYSTEM FOR AN ION PROPULSION ENGINE

[75] Inventor: John R. Brophy, Valencia, Calif.

[73] Assignee: The United States of America as represented by the Administrator of the National Aeronautics and Space Administration, Washington, D.C.

[21] Appl. No.: 247,611

[22] Filed: May 23, 1994

Related U.S. Application Data

[63] Continuation of Ser. No. 66,829, May 21, 1993, abandoned.

[51] Int. Cl.$^5$ .............................................. H05H 1/00
[52] U.S. Cl. ..................... 60/202; 313/359.1; 315/5.37; 315/111.01
[58] Field of Search ............ 60/202; 313/359.1, 360.1, 313/361.1; 315/5.37, 5.41, 111.01

[56] References Cited

U.S. PATENT DOCUMENTS

| | | | |
|---|---|---|---|
| 3,156,090 | 11/1964 | Kaufman | 60/202 |
| 3,279,176 | 10/1966 | Boden | 60/202 |
| 3,345,820 | 10/1967 | Masek | 60/202 |
| 3,523,210 | 8/1970 | Ernstene et al. | 315/111 |
| 3,913,320 | 10/1975 | Reader et al. | 60/202 |
| 3,952,228 | 4/1976 | Reader et al. | 60/202 |
| 3,956,666 | 5/1976 | Reader et al. | 60/202 |
| 3,969,646 | 7/1976 | Reader et al. | 313/359.1 |
| 4,028,579 | 6/1977 | King | 60/202 |
| 4,104,875 | 8/1978 | Birner et al. | 60/202 |
| 4,481,062 | 11/1984 | Kaufman et al. | 313/361.1 |
| 4,733,530 | 3/1988 | Beattie et al. | 60/202 |
| 4,825,646 | 5/1989 | Challoner et al. | 60/202 |
| 5,146,742 | 9/1992 | Iida et al. | 60/202 |

FOREIGN PATENT DOCUMENTS

| | | | |
|---|---|---|---|
| 0505327 | 9/1992 | European Pat. Off. | 60/202 |
| 0163475 | 6/1990 | Japan | 60/202 |
| 0151574 | 6/1991 | Japan | 60/202 |

OTHER PUBLICATIONS

E. L. James & R. T. Bechtel, "Results of the Mission Profile Life Test First Test Segment: Thruster J1," AIAA Paper No. 81-0716, Apr. 1981.

R. T. Bechtel, G. E. Trump, & E. J. James, "Results of the Mission Profile Life Test," AIAA Paper No. 82-1905, Nov. 1982.

C. Collett, et al., "Thruster Endurance Test," NASA CR-135011 May 1976.

M. J. Patterson & T. R. Verhey, "5kW Xenon Ion Thruster Lifetest," AIAA Paper No. 90-2543, Jul. 1990.

V. K. Rawlin & C. E. Hawkins, "Increased Capabilities of the 30-cm Diameter Hg Ion Thruster," NASA TM-79142, May 1979.

*Primary Examiner*—Richard A. Bertsch
*Assistant Examiner*—Howard R. Richman
*Attorney, Agent, or Firm*—John H. Kusmiss; Thomas H. Jones; Guy M. Miller

[57] ABSTRACT

Apparatus for an ion engine comprises a three-grid accelerator system with the decelerator grid biased negative of the beam plasma. This arrangement substantially reduces the charge-exchange ion current reaching the accelerator grid at high tank pressures, which minimizes erosion of the accelerator grid due to charge-exchange ion sputtering, known to be the major accelerator grid wear mechanism. An improved method for life testing ion engines is also provided using the disclosed apparatus. In addition, the invention can also be applied in materials processing.

4 Claims, 3 Drawing Sheets

THREE-GRID ACCELERATOR SYSTEM FOR AN ION PROPULSION ENGINE

ORIGIN OF THE INVENTION

The invention described herein was made in the performance of work under a NASA Contract, and is subject to the provisions of Public Law 96-517 (35 U.S.C. 202) in which the Contractor has elected not to retain title.

"This application is a continuation of application Ser. No. 08/066,829, filed May 21, 1993, now abandoned."

TECHNICAL FIELD

The invention relates to methods and apparatus for electrostatic propulsion, and in particular to a three-grid accelerator system for an ion engine in which the decelerator grid is biased negatively with respect to the beam plasma.

BACKGROUND ART

High-power ion propulsion systems have been shown to be capable of providing substantial benefits for the exploration of space. Ion engines have been under development for nearly thirty years and have long since achieved performance levels (thrust, specific impulse, and efficiency) which are attractive for planetary missions. The power-limited, low-thrust nature of ion propulsion, however, results in the requirement for very long engine burn times to produce the desired spacecraft velocity change. Engine burn times of 10,000 to 15,000 hours (20½ months) are required for typical deep space missions of interest. Demonstrating useful engine lifetimes of this magnitude has historically proved to be an intractable problem, and yet such a demonstration is believed to be absolutely essential before this technology can be used on a spacecraft.

Considerable useful background material is contained in the following papers:

(1) James, E. L. and Bechtel, R. T., "Results of the Mission Profile Life Test First Test Segment: Thruster J1," AIAA Paper No. 81-0716, April 1981;

(2) Bechtel, R. T., Trump, G. E., and James, E. J., "Results of the Mission Profile Life Test," AIAA Paper No. 82-1905, November 1982;

(3) Collett, C., et. al., "Thruster Endurance Test," NASA CR-135022, May 1976;

(4) Patterson, M. J. and Verhey, T. R., "5 kW Xenon Ion Thruster Lifetest," AIAA Paper No. 90-2543, July 1990; and (5) Rawlin, V. K. and Hawkins, C. E., "Increased Capabilities of the 30-cm Diameter Hg Ion Thruster," NASA TM-79142, May 1979.

A substantial effort has been expended to demonstrate adequate engine life, as represented by numerous life tests of the 30-cm diameter mercury ion engine in the 1970s and early 1980s. Not one of these tests, however, successfully demonstrated a 10,000- to 15,000-hour useful life at full-power operation. By far the most successful test was the 4,200-hour full-power test of the J-Series engine designated J1, as reported in the paper by James and Bechtel listed as (1) above. Other significant tests included a 5,000-hour test of the J5 thruster at one-quarter power described in the paper listed as (2) above, and a 10,000-hour test of a 700 series thruster described in the paper by Collett et al. listed as (3) above. The 10,000-hour test is considered significant only in that a 30-cm diameter thruster was operated for 10,000 hours. The thruster itself was nearly completely destroyed from internal sputter erosion by the end of the test, so that the test could not be considered a successful demonstration of a 10,000-hour engine life.

These and most other ion engine endurance tests have been performed using mercury propellant. Very low tank pressures (typically less $3 \times 10^{-6}$ Torr) could be maintained during engine testing by cryopumping the mercury exhaust on surfaces at liquid nitrogen temperature in the vacuum system. Cryopumping results in very high effective pumping speeds if large surface areas are used, resulting in low background pressures. A major cost of mercury ion engine life testing turned out to be the cost of the liquid nitrogen required.

The switch from mercury to xenon propellants for ion engines made the already difficult life testing problem almost impossible. Xenon gas cannot be effectively cryopumped at liquid nitrogen temperatures. Furthermore, the heavy atomic mass of xenon greatly reduces the effective pumping speed of large oil-diffusion pumps. Finally, the 5-kW xenon thruster under development at NASA Lewis Research Center operates at a propellant flow rate that is 60% higher than the 2.7-kW J-Series mercury engine. The combination of these factors makes xenon engine life testing at low tank pressures very difficult and expensive.

Very low background pressures are required for ion engine life testing in order to minimize charge exchange erosion of the accelerator grid. The accelerator grid is the downstream electrode of the ion accelerator system, as shown in FIG. 1, and is typically biased several hundred volts negative of the beam plasma potential to shield the positive high-voltage engine from electrons produced by the neutralizer cathode. Charge-exchange ions created downstream of the engine, however, are accelerated into the negative accelerator grid and cause sputter erosion.

The production rate of charge-exchange ions is a strong function of the background pressure, as indicated in FIG. 2. The increase in accelerator grid current evident in FIG. 2 results from the increase in charge-exchange ion production with tank pressure. The datum point labeled "LeRC 890 HR LIFE TEST" represents the accelerator grid current and tank pressure at which NASA Lewis Research Center performed their 5-kW ion engine endurance test, described by M. J. Patterson and T. R. Verhey in the reference listed as (4) above. The solid line in FIG. 2 is a curve fitted to data taken at NASA Lewis Research Center and indicates that the accelerator grid current asymptotically approaches a minimum value of 11.2 mA at zero background pressure.

The 5-kW endurance test described in the paper by Patterson and Verhey listed as (4) above was performed with an accelerator current of 18N2 mA, which is approximately 60% higher than the zero pressure current. At this current level and an accelerator grid voltage of −300 V, erosion resulted in holes completely through the accelerator grid webbing in less than 890 hours. The solid line in FIG. 2 indicates that the accelerator current can be reduced to 12 mA at a background pressure of $10^{-6}$ Torr.

However, to achieve a background pressure of $10^{-6}$ Torr during full-power operation of the 5-kW engine requires a pumping speed of approximately 700,000 liters/s. To put this number in perspective, the large tank 5 at NASA Lewis Research Center with two He cryopanels will have a pumping speed on Xe of 250,000 liters/s. In addition, the Lewis Research Center Space Power Facility (SPF), with 36 48" oil diffusion pumps has a xenon pumping speed of $1.4 \times 10^6$ liters/s. However, it has been estimated that the cost of operating this facility may be prohibitively expensive for long-duration engine testing.

Finally, the datum point labeled "JPL 2-GRID" on FIG. 2 indicates the accelerator grid current measured in the NASA Jet Propulsion Laboratory $8' \times 15'$ electric propulsion test facility at the minimum achievable tank pressure during engine operation at 5 kW. This accelerator grid current is approximately a factor of 3 higher than that for the Lewis Research Center 890-hour endurance test, suggesting that erosion holes would be created through the grid webbing in less than 300 hours if an endurance test were attempted in the NASA Jet Propulsion Laboratory facility.

With this background information, it is abundantly clear that life testing a 5-kW xenon ion engine is an extremely expensive undertaking. One approach to the problem is to defer the cost of the engine life demonstration to the first flight project which will use the technology. However, attempts to get a flight project to accept the cost and scheduling impacts associated with long-duration life testing have historically been unsuccessful, and there seems to be little indication that this situation will change. Thus the substantial benefits of ion propulsion are trapped within a programmatic catch-22, i.e. it is too expensive to life-test an engine without the financial resources of a flight project, and a flight project is unlikely to provide these resources for a new engine technology that has not already demonstrated that it has the required engine life.

STATEMENT OF THE INVENTION

The problems inherent in prior-art ion engines, particularly with respect to life testing, are obviated by the apparatus and methods of the present invention, which provides for a three-grid accelerator system with the decelerator grid biased negative with respect to the beam plasma. This arrangement substantially reduces the charge-exchange ion current reaching the accelerator grid at high tank pressures, which minimizes erosion of the accelerator grid due to charge-exchange ion sputtering, known to be the major accelerator grid wear mechanism.

DETAILED DESCRIPTION OF THE INVENTION

Figure 1:
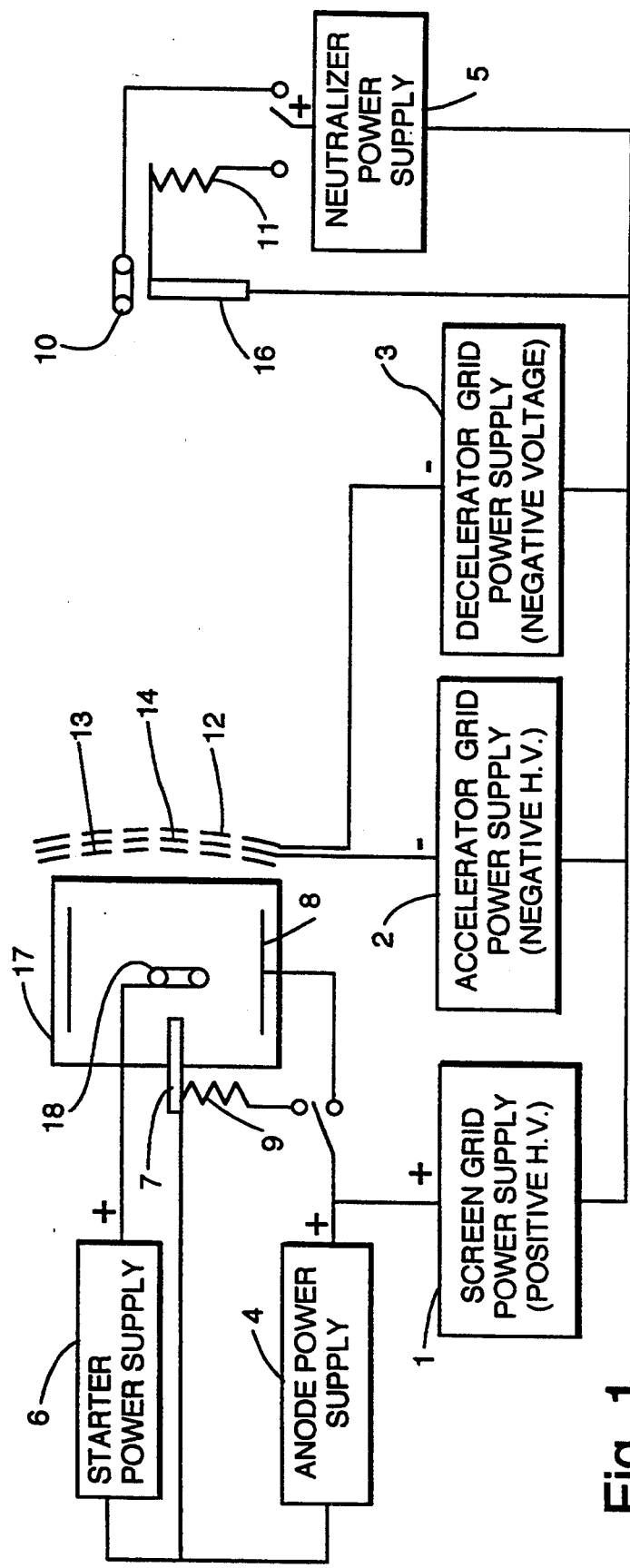
FIG. 1 is a schematic diagram of the three-grid accelerator system with negatively biased decelerator grid of the present invention.

The invention comprises an ion engine with a three-grid accelerator system in which the decelerator grid is biased negatively with respect to the beam plasma. Referring to FIG. 1, a third grid (called the decelerator grid) 12 is situated downstream of the accelerator grid 14 of a conventional two-grid accelerator system. Normally, three-grid systems have been operated with the decelerator grid 12 potential tied to the neutralizer cathode 16. The neutralizer cathode 16 potential is typically 15 volts negative with respect to the beam plasma in order for electrons to be drawn from the neutralizer into the beam. With the configuration of the invention, the decelerator grid 12 collects a fraction of the charge-exchange ion current which would otherwise strike the accelerator grid 14. The addition of the decelerator grid 12 has been shown to reduce the accelerator grid current by approximately 30% at low background pressures, as described in the paper to Rawlin and Hawkins listed as number (5) above.

Referring again to FIG. 1, the ion propulsion engine of the present invention is operated in the following manner. Propellant gas is introduced into the neutralizer cathode 16 and the neutralizer power supply 5 is switched into the neutralizer tip heater 11. When the neutralizer cathode 16 is sufficiently hot the neutralizer power supply 5 is switched to apply a positive high voltage to the neutralizer starter electrode 10. This creates a plasma discharge between the neutralizer cathode 16 and the neutralizer starter electrode 10. Subsequently, propellant gas is introduced to the main cathode 7 and the anode power supply 4 is switched into the main cathode tip heater 9 to heat the cathode. When the main cathode 7 is sufficiently hot the starter power supply 6 applies a high positive voltage to the starter electrode 18, creating a plasma discharge between the cathode 7 and the starter electrode 18. Propellant gas is introduced to the main discharge chamber 17 and the anode power supply 4 applies voltage to the anode electrode 8, causing the cathode plasma discharge to couple to the anode 8 and fill the discharge chamber 18 with plasma. The positive high-voltage screen grid power supply 1, the accelerator grid power supply 2, and the decelerator grid power supply 3 are turned on to extract and accelerate ions created in the discharge chamber out of the engine to produce thrust. Electrons are emitted by the neutralizer cathode 16 for current and space-charge neutralization.

Besides its use in ion propulsion per se, the apparatus and methods of the present invention could be used in various types of materials processing systems involving ion sources, such as for ion beam etching or micromachining. In these applications it is important to minimize contamination of the target material due to matter sputtered from the accelerator grid of the ion source. The invention permits ion source operation at higher pressures while minimizing contamination due to accelerator grid sputtering.

Accordingly, the invention also encompasses a method of operating an ion propulsion engine so that the exhaust of said engine is used for the modification of materials, the engine having an accelerator system including an anode, a cathode, a first, screen grid, a second, accelerator grid, and a neutralizer cathode, comprising the steps of providing a third, decelerator grid downstream of the accelerator grid; biasing the decelerator grid negative of the neutralizer cathode; and directing the exhaust of the ion propulsion engine toward the materials for the modification thereof, wherein the providing of the decelerator grid and the negative biasing thereof reduces the contamination of the materials from matter sputtered from the accelerator grid as a result of operation in high vacuum.

Tests in which the decelerator grid (of a three-grid system) was intentionally biased negative of the neutralizer cathode potential indicated that as the magnitude of the negative voltage on the decelerator grid was increased, the fraction of the charge-exchange current collected by the decelerator grid also increased, resulting in a reduction in the accelerator grid current.

Figure 2:
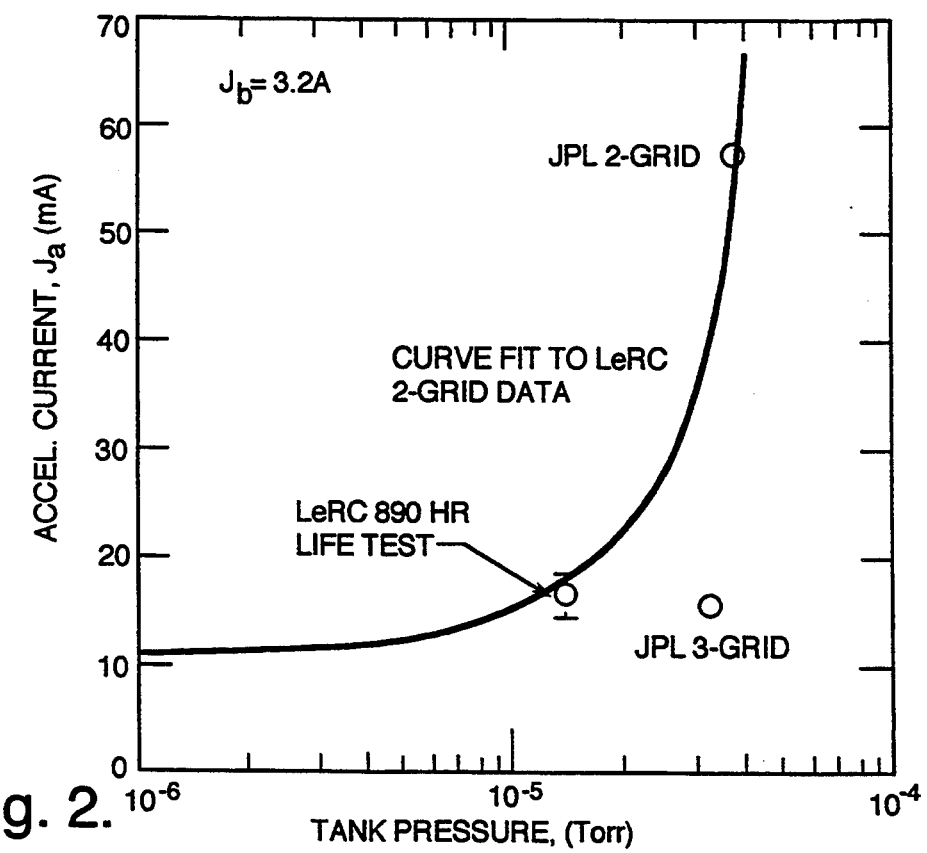
FIG. 2 is a graph of the variation in accelerator grid current $J_a$ with tank pressure at a beam current $J_b$ of 3.2 A for a 30-cm diameter ion thruster; also shown is a point indicating the significant reduction in $J_a$ when three-grid optics is used with the decelerator grid biased 100 Volts negative of neutralizer common potential.

The data in FIG. 2 include a point at the lower right indicating the accelerator grid current for a three-grid system with the decelerator grid biased 100 V negative of neutralizer common potential and the accelerator grid at $-400$ V. Comparing the JPL 2-grid and 3-grid data points of 57 and 16 mA, respectively, indicates that the method of the present invention has reduced the accelerator grid current by a factor of approximately 3.5. In fact, the accelerator grid current on the JPL 3-grid system is actually slightly less than the 18 mA measured on the Lewis Research Center 2-grid system during the 890-hour endurance test, even though the tank pressure at NASA Jet Propulsion Laboratory was nearly a factor of 3 higher (corresponding to a factor of 3 lower pumping speed at NASA Jet Propulsion Laboratory).

Reducing the accelerator grid voltage to $-300$ V on the JPL three-grid system while maintaining the decelerator grid voltage at $-100$ V reduced the accelerator grid current still further to a value of only 14 mA at a tank pressure of $3.7 \times 10^{-6}$ Torr. This current is comparable to that which would be expected at a tank pressure of $5 \times 10^{-6}$ Torr on a conventional two-grid accelerator system and corresponds to an effective pumping speed, in terms of accelerator grid erosion, of 350,000 liters/s.

Figure 3:
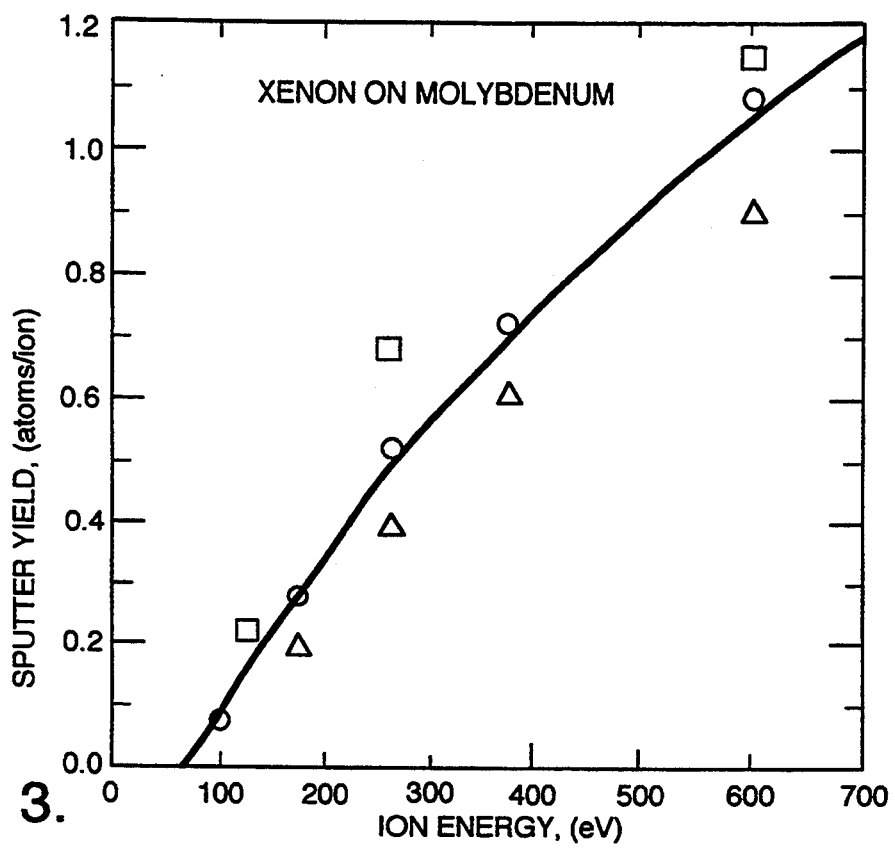
FIG. 3 is a graph of the variation in molybdenum sputter yield with xenon ion energy.

With the three-grid technique of the invention, the charge-exchange ion current which previously struck the accelerator grid is now collected by the negatively biased decelerator grid. It might then be expected that a severe accelerator grid erosion problem has simply been traded for an equally severe decelerator grid erosion problem. This is not the case, however, because the magnitude of the decelerator grid voltage is significantly less than that applied to the accelerator grid, and the sputter yield of xenon ions on molybdenum decreases rapidly with ion energy, as indicated in FIG. 3. The data in FIG. 3 were taken from three different references and roughly indicate that the sputter yield at 100 V is a factor of 10 less than that at 300 V. Thus the decelerator grid at $-100$ V could collect 10 times the ion current of the accelerator grid at $-300$ V and still have a comparable erosion rate. In reality, the decelerator grid current is typically only a factor of 2 to 4 greater than the accelerator grid current (as indicated in FIG. 4 for a beam current of 1.5 A) so that the decelerator grid erosion rate will be less than that of the accelerator grid.

Figure 4:
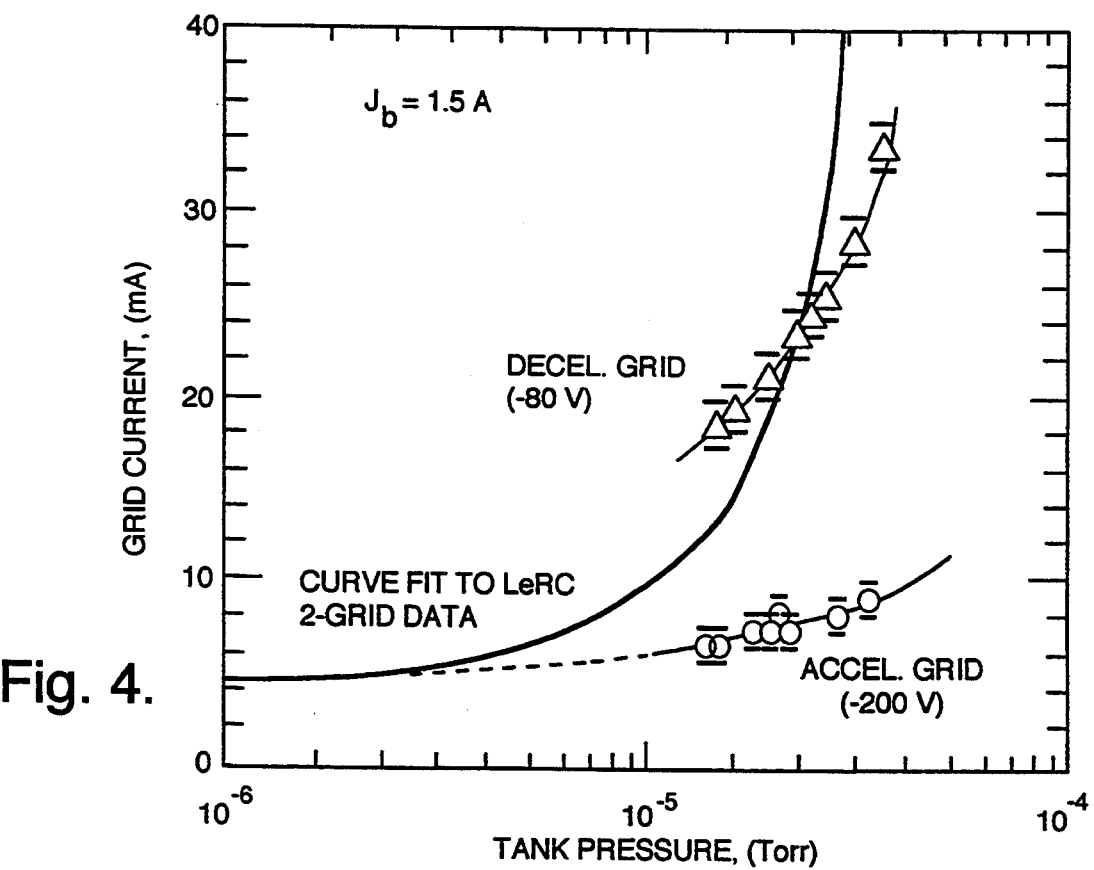
FIG. 4 shows the variation in accelerator and decelerator grid currents versus tank pressure for a beam current of 1.5 A superimposed on a curve fitted to two-grid data.

The data in FIG. 4 were taken with accelerator and decelerator grid voltages of $-200$ V and $-80$ V, respectively, but the ratio of sputter yields at these energies is still 10 to 1. Significantly, however, the sputter yield at $-200$ V is a factor of 2 less than that at $-300$ V, resulting in a factor of 2 decrease in accelerator grid erosion rate. This highlights another advantage of the three-grid system of the invention. By biasing the decelerator grid negative, it is possible to reduce the magnitude of the negative voltage on the accelerator grid without inducing electron backstreaming from the neutralizer cathode. This has the effect of increasing the accelerator grid lifetime by reducing the sputter yield.

The use of this technique on a flight-type propulsion system requires the addition of a power supply to the power processor unit. This power supply, which is used to bias the decelerator grid negative, processes very little power—on the order of a few Watts—and therefore has a minor impact on the overall system complexity. With this configurations a typical power processor unit will have a total of six power supplies, five of which are required for steady-state operation. In contrast, the 30-cm diameter, mercury ion engines for the SEPS (Solar Electric Propulsion Stage) program required a total of twelve power supplies, eight of which were used for steady-state operation.

The significant reduction in accelerator grid charge-exchange current made possible through the use of a three-grid system with a negatively biased decelerator grid enables ion engine life testing to be performed at significantly higher background pressures than was the case up until now. With the technique of the present invention, it is possible for life tests to be performed in relatively inexpensive vacuum facilities with modest pumping speeds. For example, a 5-m long $\times$ 3-m diameter vacuum facility with two 48" cryopumps would be sufficient to perform 5,000- to 10,000-hr engine life testing at 5 kW. This facility would have a pumping speed of approximately 38,000 liters/s on xenon and 70,000 liters/s second on argon.

It is believed that there is a direct cause and effect relationship between the fact that there has never been a successful life test of a primary propulsion ion engine and the fact that there are no planetary flight programs slated to use ion propulsion. The technology is now available to change this situation.

Those having skill in the arts relevant to the present invention will undoubtedly think of various obvious modifications or additions to the invention based upon the preferred embodiment disclosed herein. Therefore, it should be understood that the invention is not to be limited to the disclosed embodiment, but is to be limited only by the scope of the following claims.

I claim:

1. In an accelerator system for an ion propulsion engine including an anode, a cathode, a first, screen grid, a second, accelerator grid, and a neutralizer cathode, an improvement comprising:
   a third, decelerator grid disposed between said accelerator grid and an ion exhaust stream exiting said engine, said decelerator grid being at a lower electrical potential than said neutralizer cathode and at a higher electrical potential than said accelerator grid.

2. The ion propulsion accelerator system of claim 1 wherein said ion propulsion engine utilizes a propellant material in the vapor phase.

3. The ion propulsion accelerator system of claim 2 wherein said propellant material is a noble gas.

4. The ion propulsion accelerator system of claim 3 wherein said noble gas is xenon.

* * * * *